(12) United States Patent
Newman (10) Patent No.: US 8,893,518 B2
(45) Date of Patent: Nov. 25, 2014

(54) ACCELERATING, OPTIMIZING AND CONTROLLING PRODUCT COOLING IN FOOD PROCESSING SYSTEMS

(75) Inventor: Paul Bernard Newman, Fallbrook, CA (US)

(73) Assignee: ICS Solutions B.V., Amsterdam (NL)

( * ) Notice: Subject to any disclaimer, the term of this patent is extended or adjusted under 35 U.S.C. 154(b) by 195 days.

(21) Appl. No.: 13/452,207

(22) Filed: Apr. 20, 2012

(65) Prior Publication Data

US 2012/0266614 A1    Oct. 25, 2012

Related U.S. Application Data

(60) Provisional application No. 61/478,665, filed on Apr. 25, 2011.

(51) Int. Cl.
| | |
|---|---|
| *F25D 25/00* | (2006.01) |
| *A23L 3/36* | (2006.01) |
| *C09K 5/10* | (2006.01) |
| *A23L 3/349* | (2006.01) |
| *F28D 15/00* | (2006.01) |

(52) U.S. Cl.
CPC ... *C09K 5/10* (2013.01); *A23L 3/36* (2013.01); *F28D 15/00* (2013.01); *A23L 3/349* (2013.01)
USPC .......................................................... 62/62

(58) Field of Classification Search
USPC .................. 62/62, 235.1; 165/104.19, 104.13
See application file for complete search history.

(56) References Cited

U.S. PATENT DOCUMENTS

| | | | |
|---|---|---|---|
| 1,419,139 A | 6/1922 | Hunter | |
| 1,868,996 A | 7/1932 | Sharp | |
| 1,923,421 A | 8/1933 | Chapman | |
| 1,969,187 A | * 8/1934 | Schutt | ........................ 165/236 |
| 2,556,385 A | 6/1951 | Allan | |
| 2,595,708 A | 5/1952 | Salfisberg et al. | |
| 2,633,284 A | 3/1953 | Moffett et al. | |
| 2,660,512 A | 11/1953 | Webster | |
| 2,806,423 A | 9/1957 | Van Der Winden | |
| 2,818,012 A | 12/1957 | Webster | |
| 2,870,954 A | 1/1959 | Kulesza | |

(Continued)

FOREIGN PATENT DOCUMENTS

| | | |
|---|---|---|
| DE | 881896 | 7/1953 |
| DE | 2334443 | 2/1975 |

(Continued)

OTHER PUBLICATIONS

U.S. Appl. No. 13/449,718 , "Non-Final Office Action", Nov. 22, 2013, 12 pages.

(Continued)

*Primary Examiner* — Melvin Jones (74) *Attorney, Agent, or Firm* — Christensen O'Connor Johnson Kindness PLLC (57) ABSTRACT

A coolant mixture, method and apparatus for accelerated cooling of product, especially foodstuffs, is disclosed. A further aspect of this invention is the optimizing and controlling of the cooling process and the cooling medium without the need for pressurization. It further relates to a method of effectively increasing the flexibility and maximizing of cooling capacity and its storage without inducing a change of physical state within the coolant nor incurring high energy costs. Finally it relates to effectively eliminating any corrosive properties of the cooling medium.

21 Claims, 1 Drawing Sheet

(56) References Cited

U.S. PATENT DOCUMENTS

| | | |
|---|---|---|
| 2,968,232 A | 1/1961 | Carvallo |
| 2,976,988 A | 3/1961 | Schneider |
| 3,088,180 A | 5/1963 | Lauterbach |
| 3,286,619 A | 11/1966 | Lee |
| 3,377,173 A | 4/1968 | Winden |
| 3,394,793 A | 7/1968 | Reimers et al. |
| 3,407,721 A | 10/1968 | Carvallo |
| 3,469,988 A | 9/1969 | Yawger |
| 3,478,677 A | 11/1969 | Mencacci |
| 3,545,985 A | 12/1970 | Mencacci et al. |
| 3,637,132 A | 1/1972 | Gray |
| 3,927,976 A | 12/1975 | Reimers et al. |
| 3,960,670 A | 6/1976 | Pflug |
| 4,067,691 A | 1/1978 | McGady et al. |
| 4,116,117 A | 9/1978 | Bogaard |
| 4,196,225 A | 4/1980 | Mencacci |
| 4,206,299 A | 6/1980 | Yamazaki et al. |
| 4,295,566 A | 10/1981 | Vincek |
| 4,389,371 A | 6/1983 | Wilson et al. |
| 4,396,582 A | 8/1983 | Kodera |
| 4,476,263 A | 10/1984 | Owens |
| 4,522,015 A | 6/1985 | Hildebolt |
| 4,547,383 A | 10/1985 | Goldhahn |
| 4,631,115 A | 12/1986 | Berg et al. |
| 4,739,699 A | 4/1988 | Nelson et al. |
| 4,816,269 A | 3/1989 | Nelson et al. |
| 4,861,559 A | 8/1989 | Sugisawa et al. |
| 4,990,347 A | 2/1991 | Rasmussen et al. |
| 5,141,662 A | 8/1992 | Dexheimer et al. |
| 5,160,755 A | 11/1992 | Mignogna et al. |
| 5,218,829 A | 6/1993 | DeJarnette |
| 5,240,725 A | 8/1993 | Akamatsu et al. |
| 5,283,033 A | 2/1994 | Dodrill |
| 5,307,985 A | 5/1994 | Beizermann |
| 5,351,828 A | 10/1994 | Becker et al. |
| 5,368,093 A | 11/1994 | Takehashi |
| 5,370,174 A | 12/1994 | Silvestrini et al. |
| 5,478,990 A | 12/1995 | Montanari et al. |
| 5,484,547 A | 1/1996 | Mendoza |
| 5,696,686 A | 12/1997 | Sanka et al. |
| 5,711,984 A | 1/1998 | Woodward |
| 5,747,085 A | 5/1998 | Veltman et al. |
| 5,759,486 A | 6/1998 | Peterson |
| 5,839,832 A | 11/1998 | Hagino |
| 5,857,312 A | 1/1999 | Walden |
| 5,872,359 A | 2/1999 | Stewart et al. |
| 5,894,929 A | 4/1999 | Kai et al. |
| 6,017,572 A | 1/2000 | Meyer |
| 6,025,189 A | 2/2000 | Bolea et al. |
| 6,071,474 A | 6/2000 | Martinsen et al. |
| 6,086,782 A | 7/2000 | Hsu et al. |
| 6,090,425 A | 7/2000 | Samimi |
| 6,096,358 A | 8/2000 | Murdick et al. |
| 6,148,249 A | 11/2000 | Newman |
| 6,251,337 B1 | 6/2001 | Kane |
| 6,389,828 B1 * | 5/2002 | Thomas ............................ 62/186 |
| 6,416,711 B2 | 7/2002 | Weng |
| 6,440,361 B2 | 8/2002 | Weng |
| 6,472,008 B2 | 10/2002 | Weng |
| 6,868,873 B2 | 3/2005 | Frisk |
| 7,008,501 B2 | 3/2006 | Lohwasser et al. |
| 7,008,659 B1 | 3/2006 | Ono |
| 7,141,102 B2 | 11/2006 | Fukutani et al. |
| 7,178,555 B2 | 2/2007 | Engel et al. |
| 7,396,521 B2 | 7/2008 | Hwang |
| 7,452,561 B2 | 11/2008 | Newman |
| 7,475,786 B2 | 1/2009 | McVay |
| 7,533,512 B2 | 5/2009 | Levati et al. |
| 7,543,455 B1 | 6/2009 | Chen |
| 7,666,457 B1 | 2/2010 | Lang et al. |
| 7,846,486 B2 | 12/2010 | Camu |
| 7,880,887 B2 | 2/2011 | Olson et al. |
| 7,985,349 B2 | 7/2011 | Yang et al. |
| 8,181,474 B2 | 5/2012 | Chen |
| 8,206,607 B2 | 6/2012 | Evans et al. |
| 8,479,532 B2 | 7/2013 | Cocchi et al. |
| 8,575,525 B2 | 11/2013 | Mackay et al. |
| 2001/0041150 A1 | 11/2001 | Weng |
| 2003/0211212 A1 | 11/2003 | Belongia et al. |
| 2005/0040251 A1 | 2/2005 | Daly |
| 2005/0123435 A1 | 6/2005 | Cutler et al. |
| 2005/0253109 A1 | 11/2005 | Tran |
| 2006/0038159 A1 | 2/2006 | Fukutani et al. |
| 2006/0051639 A1 | 3/2006 | Yang et al. |
| 2007/0122335 A1 | 5/2007 | Hwang |
| 2007/0160494 A1 | 7/2007 | Sands |
| 2007/0275178 A1 | 11/2007 | Nishi et al. |
| 2007/0293980 A1 | 12/2007 | Gudjonsson et al. |
| 2008/0048147 A1 | 2/2008 | Eaton |
| 2008/0152537 A1 | 6/2008 | Wild et al. |
| 2008/0311259 A1 | 12/2008 | Singh et al. |
| 2008/0315152 A1 | 12/2008 | Daly |
| 2009/0057607 A1 | 3/2009 | Evans et al. |
| 2009/0081417 A1 | 3/2009 | Schmal et al. |
| 2009/0142223 A1 | 6/2009 | Hyde et al. |
| 2009/0169693 A1 | 7/2009 | Hoffman |
| 2009/0178928 A1 | 7/2009 | Groos et al. |
| 2009/0191318 A1 | 7/2009 | Cocchi et al. |
| 2009/0238937 A1 | 9/2009 | Yamazaki et al. |
| 2009/0301118 A1 | 12/2009 | Chen |
| 2009/0301119 A1 | 12/2009 | Chen |
| 2010/0006796 A1 | 1/2010 | Yang et al. |
| 2010/0119670 A1 | 5/2010 | Mazzariello |
| 2010/0173060 A1 | 7/2010 | Perren et al. |
| 2010/0178404 A1 | 7/2010 | Yoakim et al. |
| 2011/0104350 A1 | 5/2011 | Clüsserath et al. |

FOREIGN PATENT DOCUMENTS

| | | |
|---|---|---|
| DE | 102009018489 | 10/2010 |
| EP | 362975 | 4/1990 |
| EP | 808631 | 11/1997 |
| EP | 0990689 A2 | 4/2000 |
| EP | 1359097 | 11/2003 |
| EP | 1964785 | 9/2008 |
| EP | 2177116 | 4/2010 |
| EP | 2223618 | 9/2010 |
| EP | 2574243 B1 | 4/2014 |
| GB | 1206061 | 9/1970 |
| GB | 2285126 | 6/1995 |
| GB | 2408440 | 6/2005 |
| GB | 2427601 | 1/2007 |
| GB | 2449288 | 11/2008 |
| JP | 2011 012166 A | 1/2011 |
| WO | 8804145 | 6/1988 |
| WO | 9611592 | 4/1996 |
| WO | 0027227 | 5/2000 |
| WO | 0027229 | 5/2000 |
| WO | 0221928 | 3/2002 |
| WO | 0237975 | 5/2002 |
| WO | 03018706 | 3/2003 |
| WO | 2004017741 | 3/2004 |
| WO | 2006092376 | 9/2006 |
| WO | 2007020469 | 2/2007 |
| WO | 9807452 | 2/2008 |
| WO | 2008093367 | 8/2008 |
| WO | 2009005767 | 1/2009 |
| WO | 2010092360 | 8/2010 |

OTHER PUBLICATIONS

U.S. Appl. No. 13/449,718, "Response to Restriction Requirement", Oct. 28, 2013, 5 pages.
U.S. Appl. No. 13/449,718, "Restriction Requirement", Sep. 26, 2013, 6 pages.
U.S. Appl. No. 13/450,693, "Non-Final Office Action", Nov. 8, 2013, 32 pages.
U.S. Appl. No. 13/450,693, "Response to Non-Final Office Action", Mar. 7, 2014, 30 pages.
U.S. Appl. No. 13/450,693, "Response to Restriction Requirement", Oct. 17, 2013, 7 pages.
U.S. Appl. No. 13/450,693, "Restriction Requirement", Sep. 17, 2013, 6 pages.

(56) References Cited

OTHER PUBLICATIONS

U.S. Appl. No. 13/464,997 , "Non-Final Office Action", Sep. 12, 2013, 11 pages.
U.S. Appl. No. 13/464,997 , "Response to Non-Final Office Action", Jan. 13, 2014, 22 pages.
U.S. Appl. No. 13/464,997 , "Response to Restriction Requirement", May 1, 2013, 6 pages.
U.S. Appl. No. 13/464,997 , "Restriction Requirement", Apr. 5, 2013, 13 pages.
U.S. Appl. No. 13/624,411 , "Non-Final Office Action", Mar. 11, 2014, 8 pages.
U.S. Appl. No. 13/624,411 , "Response to Restriction Requirement", Feb. 19, 2014, 8 pages.
U.S. Appl. No. 13/624,411 , "Restriction Requirement", Dec. 19, 2013, 6 pages.
U.S. Appl. No. 61/079,185 , "Continuous Monitoring, Measuring and Controlling the Properties of Artificial Casings with Special Reference to Cellulose and Fibrous Casings", filed Mar. 2009.
U.S. Appl. No. 61/182,696 , "Printing of Data, Logos and Coded or Uncoded Information on Wet Surfaces and High Moisture Content, Natural, Unprocessed and Processed Foodstuffs.", filed May 2009.
U.S. Appl. No. 61/182,731 , "Continuous Monitoring, Measuring and Controlling the Properties of Webs, Films and Tubular Casings with Special Reference to Cellulose and Fibrous Casings", file May 2010.
U.S. Appl. No. 61/478,190 , "Adaptive Packaging for Food Processing Systems", filed Apr. 22, 2011.
U.S. Appl. No. 61/478,491 , "Apparatus and Method for Optimizing and Controlling food processing performance especially in continuous sterilizing or pasteurizing systems", filed Apr. 23, 2011.
U.S. Appl. No. 61/478,665 , "Accelerating, Optimizing and Controlling product cooling in food processing systems especially continuous sterilizing or pasteurizing systems", filed Apr. 25, 2011.
U.S. Appl. No. 61/480,521 , "Novel Continuous and Flexible food and drink processing technology", filed Apr. 29, 2011.
U.S. Appl. No. 61/483,923 , "Method and Apparatus for Enhanced Performance of a Conventional Continuous Sterilizing System", filed May 9, 2011.
U.S. Appl. No. 61/488,220 , "Enhanced Product Capacity, Quality and Handling Flexibility Within a Conventional Continuous Food Processing System", filed May 20, 2011.
U.S. Appl. No. 61/540,010 , "Novel Thermal Transfer Media for Processing of Food and Drink Products", filed Sep. 28, 2011.
Ball , "Foundation of Food Process Calculation Methods", Sterilization in Food Technology, 1992, pp. 124-125.
Ball et al., "Heating Curve-Simple Logarithmic Temperature Rise", Sterilization in Food Technology, Theory, Practice and Calculations, 12:313-329.
Berlinet et al., "Effect of Pulp Redaction and Pasteurization on the Release of Aroma Compounds in Industrial Orange Juice", J. Food Sci., vol. 72, No. 8, Oct. 2007, pp. 5535-5543.
Bichier et al., "Thermal Processing of Canned Foods Under Mecheanical Agitation", Asme Heat Transfer Div Publ HTD; American Society of Mechanical Engineers, Heat Transfer in Food Processing, Abstract, 1993.
Browning et al., "Selecting and Maintaining Glycol Based Heat Transfer Fluids", Facilities Engineering Journal, Sep. 2010, pp. 16-18.
Casolari , Food Microbiology, 1994, vol. 11, pp. 75-84.
Chang et al., "Modeling Heat Transfer During Oven Roasting of Unstuffed Turkeys", Journal of Food Science, 1998, 63(2):257-261.
Chang et al., "Heat Transfer and Simulated Sterilization of Particulate Solids in a Continuously Flowing System", J. Food Sci., 1989, vol. 54(4):1017-1023 & 1030.
Chen et al., "Modeling Coupled Heat and Mass Transfer for Convection Cooking of Chicken Patties", Journal of Food Engineering, 1999, 42:139-146.
Clausing , "Numerical Methods in Heat Transfer", Lectures on Advanced Heat Transfer, 1989, 157-181.
Conway et al., "Commercial Portion-Controlled Foods in Research Studies: How Accurate are Label Weights", Journal of the American Dietetic Association, vol. 104, No. 9, Sep. 2004.
Datta et al., "Computer-Based Retort Control Logic for On-Line Correction of Process Deviations", J. Food Sci., 1986, 51(2):480-483 & 507.
Denys et al., "Evaluation of Process Deviations, Consisting of Drops in Rotational Speed, During Thermal Processing of Foods in Rotary Water Cascading Retorts", J. Food Eng., 1996, 30:327-338.
Dias et al., "Anhydrous Bioethanol Production Using Bioglycerol: Simulation of Extractive Distillation Process", European Symposium on Computer-Aided Process Engineering, 2009, 519-524.
Downing et al., "Canning of Marine Products", A Complete Course in Canning and Related Processes, 1996, Book III; 312-322.
EP12164764.8, "European Search Report", Aug. 16, 2012, 11 pages.
EP12164764.8, "Office Action", Oct. 8, 2013, 5 pages.
EP12164764.8, "Response to European Search Report", Apr. 22, 2013, 42 pages.
EP12164764.8, "Response to Office Action", Feb. 10, 2014, 38 pages.
EP12164859.6, "European Search Report", Aug. 21, 2012, 5 pages.
EP12164859.6, "Office Action", Jul. 19, 2013, 3 pages.
EP12164859.6, "Response to European Search Report", Apr. 22, 2013, 30 pages.
EP12164859.6, "Response to Office Action", Nov. 7, 2013, 48 pages.
EP12165126.9, "Communication Pursuant to Rule 71(3)", Jan. 9, 2014, 31 pages.
EP12165126.9, "European Search Report", Jul. 23, 2012, 8 pages.
EP12165126.9, "Office Action", Aug. 2, 2013, 4 pages.
EP12165126.9 , "Response to European Search Report", Jun. 19, 2013, 33 pages.
EP12165126.9, "Response to Office Action", Dec. 9, 2013, 50 pages.
EP12165959.3, "European Search Report", Jul. 24, 2012, 6 pages.
EP12165959.3, "Response to European Search Report", Apr. 26, 2013, 39 pages.
EP12167138.2, "Decision to Grant", Dec. 12, 2013, 2 pages.
EP12167138.2, "European Search Report", Aug. 17, 2012, 6 pages.
EP12167138.2, "Response to European Search Report", May 14, 2013, 49 pages.
EP12168270.2, "European Search Report", Sep. 19, 2012, 4 pages.
EP12168270.2, "Response to European Search Report", May 21, 2013, 63 pages.
EP12186224.7 , "Communication Under Rule 71(3)", Dec. 19, 2013, 29 pages.
EP12186224.7 , "European Search Report", Dec. 20, 2012, 6 pages.
EP12186224.7 , "Response to European Search Report", Oct. 1, 2013, 34 pages.
Erdogdu et al., "Modeling of Heat Conduction in Elliptical Cross Section: 1 Development and Testing of the Model", Journal of Food Eng., 1998, vol. 38, 223-239.
Fahloul et al., "Measurements and Predictive Modelling of Heat Fluxes in Continuous Baking Ovens", Journal of Food Engineering, 1995, 26:469-479.
Fastag et al., "Variable Control of a Batch Retort and Process Simulation for Optimization Studies", J. of Food Proces Engg., Nov. 1996, 19:1-14.
Fellows , "Food Processing Technology: Principles and Practice, Chapter 12: Heat Sterilisation", second edition, 2000, 262.
Giannoni-Succar et al., "Correction Factor of Deviant Thermal Processes Applied to Packaged Heat Conduction Food", J. Food Sci, 1982, 47(2):642-646.
Gill et al., "Simulation of Ethanol Extractive Distilation with a Glycols Mixture as Entrainer", 2nd Mercosur Congress on Chemical Engineering, 2005.
Gill et al., "Computerized Control Strategies for a Steam Retort", Journal of Food Engineering, 1989, vol. 10 135-154.
Glycerine NPL , "http://www.engineeringtoolbox.com/glycerine-boiling-freezing-points-d_1590. html, 2011".
Hayakawa et al., "Estimating Heat Processes in Canned Foods", Ashrae Journal, Sep. 1975, 36-37.
http://www.artisanind.com/ps/equ , "The Artisan Rototherm", Artisan Industries Inc., Available at least as early as May 8, 2012.

(56) References Cited

OTHER PUBLICATIONS http://www.sciencemadness.org/ta , "(comments by Sauron on pp. 4-5)", Jan. 19, 2007.
Huang et al., "Meatball Cooking-Modeling and Simulation", Journal of Food Engineering, 1995, 24:87-100.
Jiang et al., "Desilication from Illite by Thermochemical Activation", Oct. 2004, vol. 14, No. 5, 1000-1005.
Lanoiselle et al., "Predicting Internal Temperature of Canned Foods During Thermal Processing Using a Linear Recursive Model", J. Food Sci., 1995, 60(4):833-840.
Larkin et al., "Experimental Errors Associated with the Estimation of Thermal Diffusivity from Thermal Process Data", J. Food Sci, 1987, 52(2):419-428.
Liu , "Modelling of Thermal Properties of Food", Handbook of Food Science, Technology and Engineering, 2006, vol. 3 Chapter 110.
Manson , "Evaluation of Lethality and Nutrient Retentions of Conduction-Heating Foods in Rectangular Containers", Food Technology, 1970, 24(11):109-113.
Martin et al., "Propylene Glycol Based Heat Transfer Fluids", http://www.engineeringtoolbox.com/propylene-glycol-d_363.html, 2011.
McConnell , "Effect of a Drop in Retort Temperature Upon the Lethality of Processes for Convection Heating Products", Food Tech., Feb. 1952, vol. 6, No. 2, 76-78.
Meng et al., "Heat Transfer to Canned Particulates in High-Viscosity Newtonian Fluids During Agitation Processing", J. Food Processing and Preservation, 2006, 30:643-658.
Morrison et al., "Glycerol", Dec. 4, 2000, 1-13.
Navankasattusas et al., "Monitoring and Controlling Thermal Processes by On-Line Measurement of Accomplished Lethality", Food Technology, Mar. 1978, 79-83.
Onita et al., "Estimation of the Specific Heat and Thermal Conductivity of Foods Only by Their Classes of Substances Contents (Water, Proteins, Fats, Carbohydrates, Fibers and Ash", Scientifical Researches. Agroalimentary Processes and Technologies, vol. 11, No. 1, 2005, pp. 217-222.
Porter et al., "Non-Newtonian Viscosity of Polymers", J. Appl. Phys., 1961, vol. 32, No. 11, 2326.
Rainbow et al., "Effect of Chelating Agents on Accumulation of Cadmium by the Barnacle Semibalanus balanoides and Complexation of Soluble Cadmium, Zinc and Copper", Marine Ecology 2, 1980, 143-152.

Sahin et al., "The Thermal Properties of Food", Springer Science, Physical Properties of Food, 2006, 107-155.
Simpson et al., "Computer Control of Batch Retort Process Operations", Food Processing Automation, Conference (Proceedings), May 1990.
Teixeira et al., "Computer Control of Batch Retort Operations with On-Line Correction of Process Deviations", Food Technology, Apr. 1982, 85-90.
Teixeira et al., "Computer Optimization of Nutrient Retention in the Thermal Processing of Conduction-Heated Foods", Food Technology, 1969, vol. 23(845):137-142.
Teixeira , "Innovative Heat Transfer Models: From Research Lab to On-Line Implementation", Food Processing Automation II, Proceedings of the 1992 FPEI Conference, May 4-6, 1992, 177-184.
Teixeira et al., "On-Line Retort Control in Thermal Sterilization of Canned Foods", Food Control, 1997, vol. 8 No. 1:13-20.
Thin-Film Drying , LCI Corporation, Available at least as early as May 8, 2012.
Wang et al., "A Mathematical Model of Simultaneous Heat and Moisture Transfer During Drying of Potato", Journal of Food Engineering, 1995, 24:47-60.
Weng et al., "Process Deviation Analysis of Conduction-Heating Canned Foods Processed in a Hydrostatic Sterilizer Using a Mathematical Model", Journal Food Processing Automation IV, 1995, vol. 41(6):368-379.
Weng et al., "The Use of a Time-Temperature-Integrator in Conjunction with Mathematical Modelling for Determining Liquid/Particle Heat Transfer Coefficients", J. Food Engg., 1992, 16:197-214.
www.lytron.com/tools-and-technic , "The Best Heat Transfer Fluids for Liquid Cooling", Jul. 14, 2011.
Young et al., "Product Temperature Prediction in Hydrostatic Retorts", Transactions of the ASAE, 1983, vol. 26(1):316-320.
Young et al., "Predicting Product Lethality in Hydrostatic Retorts", Journal of Food Science, 1985, vol. 50:1467-1472.
Zhao et al., "Computer Simulation on Onboard Chilling and Freezing of Albacore Tuna", Journal of Food Science, 1998, vol. 63(5):751-755.
Nelson, "Principles of Aseptic Processing and Packaging", 2010, pp. 3-46, 101-150.
Final Office Action, U.S. Appl. No. 13/464,997, mailed May 23, 2014.
Decision to Grant, European Patent Application No. 12186224.7, mailed Mar. 27, 2014.

* cited by examiner

ACCELERATING, OPTIMIZING AND CONTROLLING PRODUCT COOLING IN FOOD PROCESSING SYSTEMS

PRIORITY

This application benefits from the priority date of Provisional Patent Application No. 61/478,665, filed 25 Apr. 2011

REFERENCES CITED

US Patents

| | | |
|---|---|---|
| U.S. Pat. No. 5,368,093 | November 1992 | Takeshige |
| U.S. Pat. No. 7,543,455 | June 2008 | Chen |
| U.S. Pat. No. 7,666,457 | February 2009 | Lang et al |
| USPA 20060038159 | January 2004 | Fukutani et al |
| USPA 20080048147 | August 2007 | Eaton |
| USPA 20080315152 | June 2008 | Daly |
| USPA 20090178928 | July 2009 | Groos et al |
| USPA 20090301118 | June 2008 | Chengyjun |
| USPA 20090301119 | June 2008 | Chengyjun |
| U.S. Pat. No. 61/478,190 | April 2011 | Newman |
| U.S. Pat. No. 61/478,491 | April 2011 | Newman |
| U.S. Pat. No. 61/488,220 | May 2011 | Newman |

Foreign Patents

| | | |
|---|---|---|
| WO/2009/005767 | June 2008 | Gross et al |

OTHER REFERENCES CITED

Desilication from illite by thermochemical activation, Jiang, T. et al.,
Trans. Non-ferrous Metal Society of China, 14(5), October 2004
Effect of Chelating Agents on accumulation of Cadmium and complexation of soluble Cadmium, Zinc and Copper, Rainbow, P.S. et al., Marine Ecology, 2, 143-152, 1980
Glycerol, methods of production
Physical Parameters of Cooling in Cryonics, Best, B.
The Artisan Rototherm, Artisan Industries Inc, www.artisanind.com
Thin-film Drying, www.lcicorp.com
Non-Newtonian Viscosity of Polymers, Porter, R. and Johnson, S.; J. Appl. Phys. 32, 2326 (1961);

FIELD OF INVENTION

The present invention relates to a coolant mixture, method and apparatus for accelerated cooling of cooked or heated products comprising a medium that is essentially neither water nor steam but can be safely used for direct or indirect contact with foodstuffs as it is comprised solely of components that are at least GRAS classified. In particular it relates to sterilizing or pasteurizing systems. A further aspect of this invention is a method and apparatus for optimizing and controlling the cooling process and the cooling medium. It further relates to a method of cost effectively increasing the storage of cooling capacity while continuously eliminating the corrosive properties of conventional cooling media.

BACKGROUND OF THE INVENTION

Large-scale heating and cooling systems use air, water and/or steam as the heating and cooling media. Pasteurization or sterilization systems conventionally use water and steam as the heating medium and water as the cooling medium. It is well known that the conventional form and function of large-scale foodstuff heating and cooling systems present major issues to manufacturing, especially in relation to product consistency and finished product quality. This is particularly true in large volume continuous systems, where cooking temperatures are elevated to meet essential microbial safety regulations and product with low thermal conductivity properties is being processed. Such products and conditions usually require extended periods of cooking and holding at elevated temperatures to achieve the necessary safety requirements.

The slow temperature rise associated with such continuous, high volume systems frequently results in significant uneven, temperature distribution. However it is the protracted high temperature holding periods to ensure effective microbial treatment that leads to overcooking of product and a significant resultant deterioration in food quality. This overcooking is not primarily due to the protracted heating cycle but is, more frequently, a consequence of a slow cooling of the product that follows the completion of the cooking and holding cycles. Pasteurization temperatures are well above optimal temperatures needed for cooking most foodstuffs, but those needed for sterilization are substantially higher still as the medium used to achieve these elevated final temperatures is primarily pressurized steam which has both a considerable latent heat content as well as a very poor thermal conductivity. Consequently, it needs very considerable amounts of energy and thermal transfer to effectively start the cooling cycle. It is the inherent inefficiencies in this part of the processing cycle that make the greatest contribution to the general over-processing and resultant deterioration in finished product quality.

Dry and wet cooking and cooling systems present different issues. The rate of thermal conductivity in air is around 20 times less efficient than that of water. While cooking times take considerably longer in air when compared with wet cooking systems, the much lower thermal conductivity makes holding times and holding temperatures much easier to maintain and control.

Similarly, cooling systems using air as the cooling medium are much slower at equivalent temperatures compared with liquid cooling systems. But much larger volumes of substantially cooler air at accelerated velocities can be moved across the product surface in unit time, so improving their efficiency, overall performance and cost effectiveness.

Generally, large-scale heating and cooling systems have tended to use water and steam to provide the cooking and cooling capabilities because of the relative low cost of the medium, its relative abundance and availability and its relative safety. Most importantly, water has one of the highest rates of thermal conductivity for liquids. Unfortunately, it is this rapid thermal conductivity that causes the greatest problems.

Firstly, such high heat capacities mean that it frequently has more energy available than the receiving product can dissipate. The result is a very rapid heating of the surfaces closest to the energy source, a slower transfer of energy within the container and considerable overcooking of some parts of the container contents, particularly that closest to energy/container interfaces. To counteract such properties, heating curves are less steep than could be optimally achieved.

Conversely, cooling curves using water as the coolant medium have to be steeper, particularly at the onset of cooling, because of the considerable amounts of latent heat encountered in the steam component, especially in sterilization systems, to a lesser extent in pasteurization systems, but particularly with retort-based processing and continuous sterilization systems.

But the heating and cooling inefficiencies of water and steam-based systems are not the only major problems for these media. Both are extremely corrosive, especially at elevated temperatures, not just to the structure and function of the processing equipment but also the containers themselves. In an effort to reduce the corrosive properties of these media, considerably additional costs are incurred, both in the capital construction costs, due to the requirement to use more resistant materials within the system structure and in their maintenance and running costs where very expensive compounds/mixtures have to be frequently added to the water to reduce leaching rates and consequent increases in its corrosiveness.

Over time there is a steady build-up of dissolved solids in the cooling water, this causes a steady increase in its Redox potential and thus its corrosive properties as well as making it more difficult to buffer. This, in turn, leads to a steady increase in the amount of anti-corrosion compound needed to maintain water quality. Eventually the only practical answer is to replace the cooling medium.

All of this generates further issues. These corrosion-resisting compounds are often toxic and, as they usually, directly or indirectly, contact foodstuffs and/or foodstuff containers, their maximum concentrations are strictly controlled, often well below their optimal protective capability. Because of their toxicity, if they directly contact foodstuffs the product has to be discarded. The thermal conductivity rate of water and its corrosive nature also seriously limits the type of containers that can be used and processed within such systems and the rate of cooling that can be achieved without damaging the container.

And finally, the change of state of water from liquid to gas on heating and reversion back to liquid on cooling, necessitates considerable system structural strengthening to counter the large pressure differences encountered.

There is one final issue that makes water a far from ideal cooling medium and that is the change of state that occurs as it cools further, i.e. from liquid to solid, and the amount of energy required (and its associated cost) to achieve this change of state. While the latent energy generated in changing from a liquid to a solid is extremely useful as a 'reservoir of cool energy', the change of state makes the formation of any solid materials, such as ice, in any circulatory cooling system extremely dangerous and potentially damaging to expensive machinery. The falling temperature may also result in a reduced solubility of dissolved solids.

Based on the foregoing, it is obvious that replacing water as a coolant, reducing or eliminating coolant corrosive properties, improving coolant refrigerant capabilities and improving cost efficiency of coolant heat transfer are all essential to achieving any significant improvement in the overall performance of a cooling system, particularly product pasteurizing and/or sterilizing systems.

While there are many liquids or mixtures that could be used to achieve one or more of these properties, extensive regulatory requirements severely limits which compounds can be used, particularly for food application uses.

Glycerin had historically been used as an automobile antifreeze but was later replaced by more efficient and cheaper glycol mixtures. More recently, with the main source of glycerin/glycerol coming from the manufacture of biodiesel from renewable resources and from sources other than petroleum resulting in a much lower supply cost than previously, there has been renewed interest in the use of glycerin/water and glycerin/alcohol/water mixtures as refrigerants (e.g. USPA 20080315152). Glycerin has GRAS status and although generally considered safe, it does produce a poisonous gas, Arcolein, when decomposed by excessive heat.

The raw glycerin is a byproduct of biofuel manufacturing, has a typical concentration of 60-82% glycerin but also contains numerous contaminants and other byproducts including glycols, alcohols, particularly methanol and ethanol, various organic and inorganic compounds, fatty acids and water.

Many refrigerant systems use various glycol mixtures or glycol/alcohol mixtures (c.f. U.S. Pat. No. 5,141,662 and USPA 20080048147). Unfortunately such compounds (particularly glycols and methanol) are not allowed to directly contact foodstuffs, although potentially they could be used as an indirect cooling medium. As such they have found considerable use as coolants in engine cooling systems as well as components of winter windscreen washer and antifreeze mixtures because, unlike water they remain in a liquid state when external or operating temperatures fall below 0° C. They have also been suggested as a suitable refrigerant in solar powered refrigerators (U.S. Pat. No. 7,543,455).

However, all these refrigerant/coolant media still contain significant amounts of water (30%-50% v/v or w/v). As a consequence, they will still generate considerable corrosion to metal components, particularly the system's physical structures. As such they need the addition of anti-corrosion compounds to allow them to function as coolants and antifreezes. Eventually, as the temperature falls, some of the water component will form solid ice.

We have found methods and apparatus that will allow a suitable glycerin only or glycerin/water mixture to function as an effective and efficient coolant, be composed only of GRAS approved components and without the need for anti-corrosion additives, they avoid any constraints in their application or use.

SUMMARY OF THE INVENTION

Definitions
In addition to specific definitions described elsewhere within this application, the following additional definitions are made:

'Heating' relates to the application of thermal energy to any food product or food product container so as to raise its temperature from any original starting temperature so as to change the original status of the said food product, e.g. induce a state of stabilization, pasteurization or sterilization.

'Foodstuff' relates to any food or drink component or mixture or product in a raw, cooked or processed state designed for consumption by humans or animals.

'Approved for Food Use' relates to any component which, by regulation, legal approval, tacitly or by convention, can be used in any aspect of the manufacture, processing, storage, use, containment and/or consumption of any foodstuff 'Glycerin' (synonymous with Glycerol and Glycerine) is the common name for the chemical compound, known under the IUPAC as Propane-1,2,3-Triol 'Reservoir of Refrigeration' relates to the property of the coolant mixture of being able to be cooled to temperatures well below 0° C. so as to be able to store substantial refrigeration capacity without any change in physical state, unlike water which changes to ice or R12 which changes from gas to liquid, to achieve the same property.

It is an object of the present invention to produce a method and apparatus for accelerated cooling of foodstuffs in a controlled and predictable manner in an essentially fluid medium with no change in the physical state of the cooling medium.

It is a further object to achieve such cooling using a medium that is not water or steam.

It is yet a further object to achieve such cooling using a medium and within a system neither of which are subjected to pressurization.

It is another object to achieve such accelerated cooling using a medium that is considered safe for direct or indirect contact with foodstuffs.

It is further object to achieve such accelerated cooling using a medium that is considered safe for direct or indirect contact with foodstuffs without the need for adding anti-corrosion additives.

It is yet another object to apply such method and apparatus to any food or drink sterilizing or pasteurizing or processing system, in particular continuous systems.

It is a further object of this invention to provide the method and apparatus with the capability for optimizing and controlling the cooling process and the cooling medium.

It is another object of the invention to apply such method and apparatus to cost effectively increase the storage of cooling capacity.

It is further object of the invention to apply such method and apparatus to cost effectively maintain the coolant in a consistent formulation.

It is a final object of the invention to eliminate the corrosive nature of conventional cooling media and maintain the cooling medium in an essentially corrosion-resistant state.

DETAILED DESCRIPTION OF INVENTION & PREFERRED EMBODIMENTS

We will now describe the current invention and any preferred embodiments of the present invention in more detail with reference, as necessary, to any accompanying drawings. It will become obvious to anyone skilled in the art that the detail of the current invention and the embodiments herein described, can be utilized in many different forms, variants and configurations and therefore the described embodiments are merely used to illustrate the potential range and scope of the invention.

We will first address the problems associated with the reduced cooling efficiencies of existing and conventional systems, their limited use due to performance constraints and regulatory restrictions and our inventions to overcome such limitations while improving product quality attributes and overall system cost performance.

There are two basic types of cooling system. There are those that have to cool an article from an elevated temperature while operating in a temperate environment, i.e. where the operational temperature requirements for the cooling system are between the freezing point and boiling point of water at atmospheric pressure. Then there are those systems that have to cool an article from an elevated temperature while operating in an environment, where the operational temperatures for the cooling system are below the freezing point and/or above the boiling point of water. Examples of the former are typical domestic heating or commercial heating, washing or cooking systems. Examples of the latter are the cooling component of a combustion engine and meat carcass rapid chill systems.

Both types use essentially the same coolant, water, but with different additives to combat the consequences of different operational conditions. Where circumstances allow, cooled air systems can be used, i.e. where a refrigerant is used to remove heat from the air and this cooled air is used to cool the heated materials. This type of approach is used in domestic and commercial refrigeration, air conditioning systems and carcass chilling systems. It is also a common practice to operate all such systems under pressure which obviously affects a system's capital and running costs.

In the temperate environment, the cooling system can be direct or indirect. Where it is indirect, i.e. the coolant does not directly contact the heated materials, the cooling system has few restrictions on the composition of the additives that can be used. For example, the heat exchanger does not need to be made from the highest quality materials providing the action of the coolant is not deleterious to the structure or composition of the system. Water is extremely corrosive to many metals and steel compositions. This can be due to many different attributes, acting alone or in combination, but especially its acidity, the presence of air/oxygen, the presence of contaminants that encourage or accelerate the formation of anions, cations or free radicals (Redox potential), the need for pressurization or increased cooling capacity.

There are a number of effective corrosion inhibiting solutions, (organic or inorganic in composition), that can be used to reduce the corrosive nature of the water coolant. Many of these neutralize the water component thus reducing the rate/degree of water ionization or make the water less alkaline or acidic. Others have attempted to reduce the corrosive properties of water by boiling water or using distilled or deionized water either alone or in combination with anti-corrosion additives. While this has an inhibitory effect for a while, metal ions will still leach from the cooling system structure and the movement of the water will induce increasing concentrations of oxygen or other gases to become dissolved within it, particularly at elevated temperatures, eventually accelerating the corrosion cycle again.

In an indirect system, the cooled coolant removes heat from the circulating cooling medium surrounding the heated materials usually through a variable combination of conduction, convection and mass transfer. This, in turn, reduces the temperature of the cooling medium in direct contact with the heated materials, thus lowering their temperature. Where one component of the coolant system is gaseous then heat transfer through radiation plays an increasingly important part.

A direct cooling system is very similar to an indirect system except that the coolant medium directly contacts the heated materials. This is significantly more efficient than an indirect system as all the energy, with the exception of that which contacts the coolant's transport and circulatory mechanism and structure, is directed to cooling the heated materials. In an indirect system, considerable amounts of cooling energy are lost both within the transport and circulatory system as well as the increasing inefficiencies due to differing rates of thermal conductivity between the system structure and the coolant itself, (e.g. the thermal conductivity of many metals including steel, making up the structure of the cooling system, is between 20× to 100× greater than water).

However, despite the enhanced performance of direct cooling systems, they are much more lightly regulated and constrained because of the direct contact between coolant and the heated material; none more so than when the heated material is an edible foodstuff or a container containing an edible foodstuff In all such cases, the coolant and any additives must be classified as safe or food use approved (GRAS status or equivalent).

When the cooling medium has to operate at temperatures above its boiling point or below the freezing point, additional physical, chemical and performance obstacles have to be overcome as the coolant undergoes a physical change of state which will affect both its performance as a coolant, the performance of the system containing the coolant and often its form and function.

When the most common coolant, water, changes from a liquid to a gas (steam), the resultant volume change encountered in the system is an increase of 1700-fold, if all the liquid coolant changes to a gaseous state. As a consequence, unless the working pressure is increased to counteract the volume change, the coolant system has to be designed, constructed and strengthened to withstand any resultant pressure changes. An alternative approach is to increase the volume of coolant in contact with the heated materials. This will decrease the volume of coolant changing state and reduce the rate of pressure change within the cooling system. We have discovered another more efficient and cost effective option, an increase in the temperature differential, $\Delta T$, between the coolant and the heated materials. This has significant cost and performance advantages that we will describe later.

When the coolant operates in conditions where it can change state from a liquid to a solid, other constraints are introduced and performance parameters need to be modified. As with a change from liquid to gas, a change from liquid to solid also results in a volume change. In the case of water there is an approximate 10% increase in volume. However, unlike the change from liquid to gas, the solid ice formed is much less reactive or compressive to a change of pressure. Consequently, the material costs to resist the pressure of the ice formation are enormous. In addition, the formation of any solid material in the liquid coolant can potentially cause increasingly expensive damage to the coolant system especially circulatory pipes and pumps.

For cooling system that have to work in such physical conditions such as car engine cooling systems, a less costly, alternative approach is adopted, namely lowering the freezing point of the coolant. This is well known to those skilled in the art and the topic is well covered in US Patent Application 20080315152 and US Patent Application 20080048147. A range of additives can be used to achieve to depress the water freezing point ranging from alcohols, glycols and glycerol. However, the water component will cause corrosion within the structure of the system and the choice of additive will reflect the anti-corrosion requirement for each application. For example, as an anti-freeze for car engines, corrosion within the radiator system is of primary importance together with provision for a protective lubricant for the circulating pump. As a windscreen washer solution, in addition to not freezing on any exposed surface, the primary concern is preventing physical and/or chemical deterioration of the various gaskets and construction materials the solution will contact.

Recently, the use of glycerol or glycerin as an anti-freeze has again become of interest, primarily because of its availability in large quantities from the manufacture of biodiesel, its significantly depressed freezing point when in dilution with water or water-containing mixtures and its accepted status as generally food safe. Unfortunately while such relatively impure mixtures of glycerin are practical for indirect cooling systems such as car engines and commercial buildings, they are impractical for direct cooling of foodstuffs or food processing systems as they contain a range of components that are not considered safe to contact foodstuffs such as methanol and glycols. Furthermore, the additives generally used to prevent corrosion are also not approved for food use.

We have surprisingly found that we can use glycerin in a very different manner to achieve a highly efficient cooling system for direct food application and especially for cooling food product subjected to sterilization or pasteurization processes, and more especially continuous processing systems with minimal to no need for additives while virtually eliminating system corrosion.

Conventional sterilization and pasteurization systems use water as a coolant. It is cheap, readily available and when treated so as to be potable, is safe to directly contact food or food containers. Unfortunately, especially at elevated temperatures, it is extremely corrosive to the structure and components of such processing systems and expensive anti-corrosion chemicals especially formulated for food use have to be continuously used to limit the rate of system corrosion. It has a low viscosity and therefore easily and rapidly entrains air/oxygen within its flow as it is pumped around the system. While the use of distilled or deionized water has been advocated, high cost limits the practicality of such approaches. Additionally, the presence of any ionic particles within the solution will further enhance corrosion. This is an especial problem with steam-based sterilization of metal and glass containers as well as pouches and bags derived from organic plastic materials.

Figure 1:
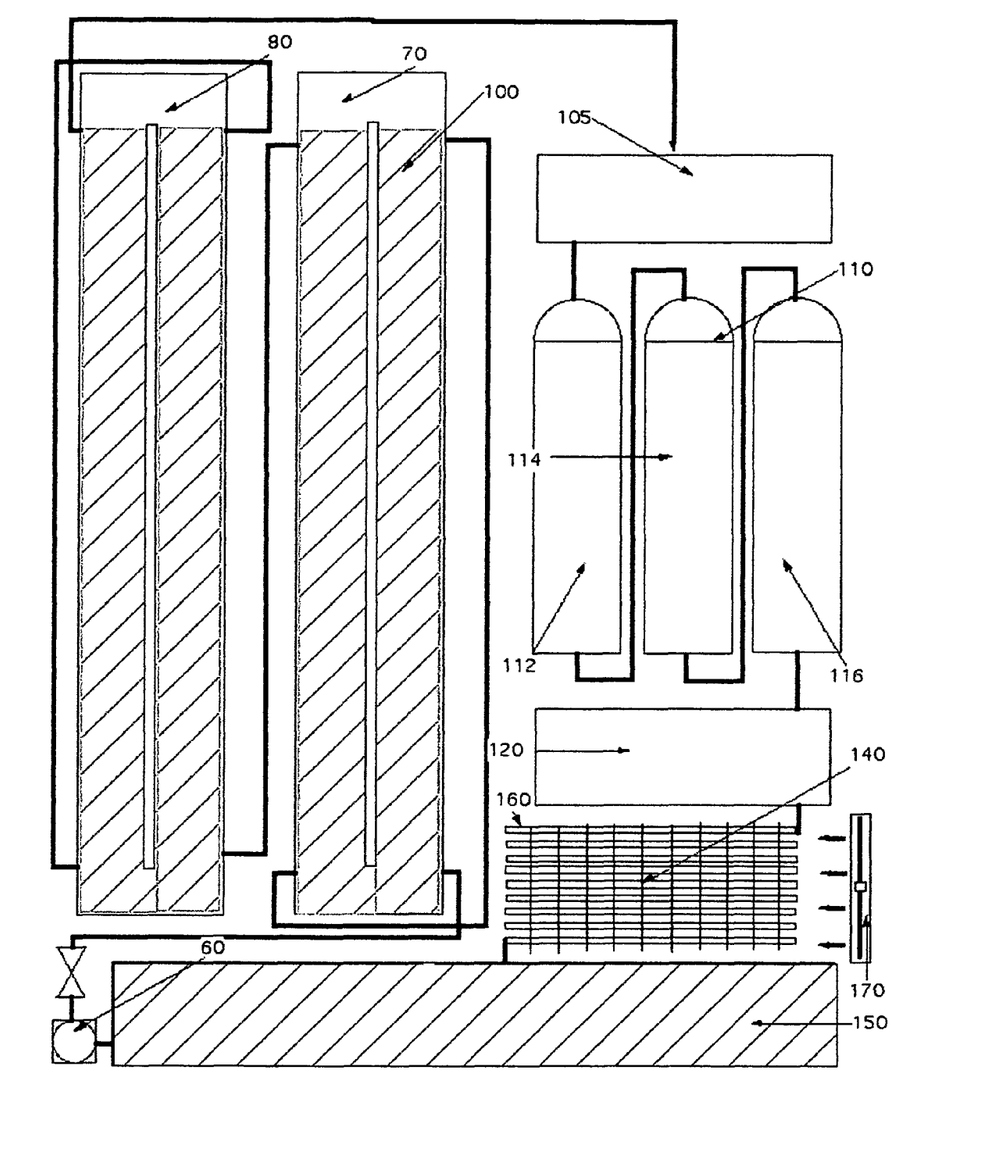
FIG. 1 shows a diagrammatic representation of the configuration and function of the accelerated coolant mixture, method and apparatus.

In a preferred embodiment to the present invention, we have found that passing a glycerin/water solution (100) containing a minimum of 75% pure glycerin through columns of zeolite (110) as the coolant is continually recycled, eliminates most (more than 99%) of solids and metal ions and significantly reduces corrosion, as measured by the concentration of dissolved iron in the coolant and/or its Redox levels, to minimal amounts usually less than 1 part in 50000. The use of a pre-filter or centrifuge (105) can be used to remove debris and detritus In a further embodiment, the composition of the zeolites can be modified to optimize the conditions specific for each operation. For example, one column (112) may be optimized for removing metallic cations while another (114) may contain hydrophobic silica based zeolite to trap organic compounds. If dissolved or entrained gases, especially Oxygen need to be removed, a third column functioning as a molecular sieve (116) can be used. Where contamination levels are low or coolant volumes are relatively small, the different zeolites can be mixed or layered within the same column.

By regularly cleaning the zeolite by any suitable method, preferably ion-exchange, any contaminants within the system are continually flushed away and not allowed to accumulate, allowing the zeolite to be recycled virtually indefinitely.

To prevent corrosive or oxidative reactions, we have found that we need to keep any dissolved metals in the coolant mixture to less than 1 part per million. Zeolites on their own rarely perform to this required level.

We have found that passing the resultant coolant through a column of FAJTA salts (120) removes the last vestiges of metallic cations from the coolant or at least to levels of less than 1 part per million. In a preferred embodiment, the EDTA is a mixture of the acid, sodium salt and calcium salt. As the acid and calcium salts are virtually insoluble in water and the sodium salt has low solubility in glycerin this ensures that total solubility is low and remains low. The required concentrations of EDTA and its salts will obviously be different for each product/container processing requirements as well as local physical conditions such as the pH, dissolved solids and status of coolant components. We have found that a residual level of 100 ppm to 500 ppm of EDTA salts in this coolant mixture is sufficient for virtually all food product applications. However a level of 10 ppm to 150 ppm appears optimal for most food applications and we include this discovery as a further embodiment to this invention.

With the zeolite treatment removing most of the contaminating cations, the EDTA mixture remains effective for many months. In a further embodiment, we have further found that controlling the temperature of the coolant passing through both the zeolite and the EDTA salt mixture, allows good control of total EDTA solubility and availability.

The ideal temperature range for filtration is 70° C.-90° C., although any temperature above 40° C. and below 120° C. will allow the filtration steps to perform adequately. Elevated temperatures will cause more of the EDTA to dissolve into coolant. However, as it cools, an increasing proportion will precipitate and will be trapped within the zeolite and EDTA columns as it circulates. Temperature control in conjunction with simple but continuous monitoring of coolant Redox status, provides the system with a simple but effective control of total chelation capacity relative to processing requirements and coolant mixture status.

As described herein, the coolant mixture and the associated cleaning and chelation components are all GRAS approved and consequently can directly contact foodstuffs and food containers without restriction or further modification. However, it will be obvious to those skilled in the art that there are many possible variations for both the coolant cleaning and chelation compounds, components, their concentrations and the configuration of the apparatus to achieve this. Therefore, the description given is used merely to illustrate the concepts and approach and not meant to be limiting.

The foregoing describes how we have been able to make and maintain the coolant mixture in an inert state so minimizing the deterioration of any associated processing equipment or structure. We will now describe how we have improved coolant performance and associated food product quality from foodstuffs processed within such a system, particularly foodstuffs subjected to sterilization or pasteurization conditions, more particularly continuous processing systems.

It is obvious to anyone skilled in the art that in a conventional continuous food processing system, providing the product remains consistent, i.e. the composition and constituents do not vary beyond the allowable limits of an accepted standard for that product and the amount of available energy needed for the heating phase exceeds the total energy consumption required by the process based on the product volume passing through the system, and providing there is no change in any other variable then the amount of cooking needed to ensure effective product processing, whether sterilization or pasteurization, will be related to dwell time in a consistent manner.

Unfortunately while there will be a relatively consistent heating time, there will not be a consistent degree of cooking because of the differences in thermal conductivity between the heating medium, the product container and the foodstuff within the container. Inevitably that portion of foodstuff closest to the container/heating medium interface will heat up quicker and remain hotter for longer than that closest to the cold spot within the container which will start to be cooled once it has received the minimum energy to achieve effective sterilization or pasteurization.

There is little that can be done to improve the evenness of the heating phase, when using water or steam as the medium for thermal conductivity, without introducing very accurate methods of monitoring and matching total available energy with rates of thermal transmissivity and conductivity.

However, what it not so obvious is the total amount of product cooking and the differential between the foodstuff at the container boundary and the coolest spot within the container interior that occurs can be very accurately controlled by the cooling cycle and the rate and speed at which the product temperature can be lowered so as to curtail the cooking process. We have surprisingly found that we can achieve this with the previously described glycerol-based coolant.

Because the specific heat of glycerol is approximately double that of water, it can be cooled down significantly faster than other coolants, especially water. It also has another important property. It can be used as a very effective 'heat sink' (150), i.e. it can be cooled to temperatures significantly below that of water without changing state. In fact, when used at its optimum glycerol/water ratio, i.e. 67% glycerol, 33% water, it can be cooled to −47° C. before it starts to change state from a liquid to a solid. Hence its well known uses as an anti-freeze or as a refrigerant in air conditioning or commercial refrigeration applications.

As the same amount of energy needed to cool water to ice at 0° C., will cool glycerol mixtures to around −40° C. without changing from its liquid state, it makes an excellent refrigerant source for either direct or indirect cooling of containerized foodstuffs. It also can directly contact product emerging from the sterilization leg of a food processing system, i.e. around 122° C., again without changing state.

We have been able to combine these physical properties with a further attribute, its relative viscosity, to produce a very efficient and cost effective coolant for food processing use that we incorporate into this patent application as a preferred embodiment. At 100° C., this coolant mixture has a viscosity approximately 10 times that of water. At 50° C., its viscosity is 20 times that of water at the same temperature. However, it should also be noted that the viscosity of water at 5° C. is more than 6 times its viscosity at 100° C. This means that it forms a more intimate contact with the food container than water, making energy transfer more efficient. Although its thermal conductivity is only around 50% of that of water, because of its improved contact with its container, it performs its cooling function with greater relative efficiency than water at similar temperatures.

Furthermore, we have been able to combine all of these physical properties together to produce a highly energy efficient cooling system for food processing applications.

It is well known to those skilled in the art that the rate of cooling is dependant on the temperature differential between the cooling medium and the material requiring cooling. The closer these two temperatures are, the slower the rate of cooling. (This is the basis of Newton's Law of Cooling). Because of the very low viscosity of water and its high thermal conductivity, when used as a coolant, there is a need to move it at a significant rate in order to maintain an adequate temperature differential.

We have found that we can cool the described glycerol based coolant to much lower temperatures and circulate it at much slower speeds but generate a much higher temperature differential thus achieving a significantly faster rate of cooling.

While it is obvious that the rate of cooling cannot be faster than the thermal conductivity of the foodstuff, we have found that by utilizing its elevated viscosity, we can generate a temperature differential that more rapidly cools the foodstuff closest to the container/coolant interface thus significantly reducing the amount of over-processing and improving product quality.

Furthermore, we have been able to utilize such a process in combination with an advanced optimizing process controller (described in U.S. Patent Application 61/478,491 and hereinafter incorporated by reference) to establish and maintain optimized cooling throughout the entire cooling process simply by monitoring the system and product principle components, then calculating and optimizing the temperature differential between it and the coolant by any suitable method. In a preferred embodiment, optimized temperature differentials are achieved through controlling the pumping rate and minimizing the turbulence in the coolant as it passes over/around the processed products while monitoring the temperature of the coolant mixture and its rate of temperature change. In a further embodiment, we have shown that the efficiency of the cooling process can be still further improved by incorporating processing system improvements such as product rotation and optimized product orientation, as described in U.S. Patent Application 61/488,220, hereinafter incorporated by reference.

In yet a further preferred embodiment, we have also demonstrated that still further improvement in cooling system performance, efficiency and cost performance can be achieved through utilizing the packaging and processing advances and improvements described in U.S. Patent Application 61/478,190, hereinafter incorporated by reference We have already described how the coolant can be used as a thermal 'sink'. While it is obvious that it can be cooled by a variety of 'heat exchange' methods, most such methods generate the required temperature differential, usually through the consumption of energy sources such as a refrigerated cooling system, heat exchanger, circulating pump or similar, which makes such energy generating approaches relatively expensive to run.

In a preferred embodiment, we have been able to generate the necessary cooling of the described coolant mixture as well as its ability to act as a reservoir for refrigerant by utilizing an indirect air cooling system (140) where the outside atmosphere acts as the heat exchanger. In most manufacturing locations, the daytime temperature even in summer rarely exceeds 35° C. while nighttime temperatures often drop to 0° C. and below for long periods throughout the year.

To stop (or slow to an acceptable minimal rate) most food or drink processing reactions, temperatures need to fall to below 50° C., and somewhat lower than this when protein based foods are involved. Because of their relatively low thermal conductivities (compared with water or their food containers), optimal cooling for most moist or semi-moist foods (water activity <40) occurs when the temperature differential between coolant and foodstuff exceeds 20° C.-25° C.

Using the described novel coolant we have been able to generate all the cooling capacity required, even for large volume food processing systems, using indirect air cooling. Although small amounts of energy are needed for circulating the air across the cooling coils, compared with conventional refrigerant systems there are very substantial energy and cost savings. Indeed where environmental conditions allow, other 'green' energy sources, such as solar energy, can be used or integrated.

We have further found that when air temperatures fall below 10° C., minimal air-flow is needed to adequately cool the refrigerant. Furthermore, energy efficient maintenance of the stored cooled coolant mixture can also achieved by the same process. However, whenever the outside temperature exceeds the temperature of the stored or circulating refrigerant mixture, cooling can still occur by modifying the flow and source of the coolant, e.g. the coolant used to cool the product emerging from the heating cycle will often exceed 80° C. However, it can still be cooled to 40° C. using such an air cooling system and, if necessary, cost effective, heat exchangers can be used to 'recover' any heat extracted (160).

We have described how such a novel coolant can be used to cool foodstuffs and food containers with especial reference to sterilization and pasteurization systems, more especially continuous food processing systems. However, it is obvious that such apparatus and method can applied to a much wider range of food and non-food cooling applications such as food stabilization and we embody such application into this invention.

EXAMPLES

We will now describe some examples that detail the principle components of the system. However, the following examples serve only to illustrate the general application and methodology of this invention. It will be obvious to anyone skilled in the art that each step and every component can be modified and optimized to suit a particular product and product container configuration and, as a consequence, the possible permutations are almost infinite.

The examples quoted illustrate how the major elements and the components of those elements and the methodology interact to provide the necessary data and performance, while continuously but predictably changing the overall requirements of the product cooling system to achieve the required degree and rate of product cooling while optimizing the whole process and maximizing yield, performance, cost performance and product quality.

Example 1

Generating and Maintaining the Coolant Mixture Composition

The coolant mixture (100) is formulated using a minimum 75% v/v of glycerin, devoid of any contaminants that would prohibit it from direct contact with foodstuffs together with a maximum of 20% v/v water. The glycerin is free from other organic compounds and by-products especially glycols, alcohol, particularly methanol, fatty acids and other contaminants from its synthesis, especially biosynthesis, so that it is comprised only of glycerin and minor components, all of which are considered GRAS.

Any water used is either from distilled, or more preferably, deionized sources. Preferably the deionized water is generated from the coolant maintenance program detailed in example 2.

The status of the coolant mixture is continuously monitored and adjusted using temperature, conductivity, pH and viscometer instrumentation.

Example 2

Minimizing and Maintaining Coolant Mixture in a Non-Corrosive State

The glycerin-based coolant mixture (100) is maintained in a non-corrosive state in a 4-stage continuous monitoring, measurement and control program by continuous passage through a series of zeolite-based ion-exchange columns (110) optimized to remove metallic cations, organic and inorganic solids, organic compounds (112, 114) and, if required, dissolved and entrained gases (116), particularly oxygen. Entrained gases may also be removed through mechanical means such as lowering viscosity, for example through heating the coolant mixture and/or modifying the flow from columnar to laminar so that any trapped gas bubbles can escape. Debris and Detritus can be removed by pre-filtration or continuous centrifugation (105)

As fresh coolant mixture enters the system in a non-corrosive state, the amount of coolant filtration and regeneration required is usually small and is dependant only upon the rate at which cations and/or anions enter the system together with the formation of any additional organic solids and compounds.

The status and composition of the coolant mixture before and after filtration and ion-exchange is monitored by conductivity, pH and temperature measurement together with the addition of measuring total dissolved solids and/or ORP measurement dependant upon use and process requirements.

Such instrumentation will also indicate the status of the various columns of zeolite mixtures. When performance drops below acceptable levels, the columns can be cleaned and regenerated by any suitable method, preferably selective ion-exchange.

Example 3

Monitoring and Maintaining Coolant Mixture Free of Dissolved Metal Ions

Zeolite ion exchange technology removes significant amounts of metal ions from solutions and liquid mixtures and in the configuration and composition as described herein, removes other contaminants likely to negatively affect manufacturing performance.

However, to maintain the coolant mixture essentially free of dissolved metal ions and dissolved oxygen, so as to minimize system corrosion or the potential for corrosion, a further step is needed, chelation and particularly through the use of EDTA as the primary chelation agent (120). As with the components of the coolant mixture, it is also GRAS approved and is commonly and directly used in food and drink product applications within a range of 100 ppm-1000 ppm.

As previously described herein, we have found that a residual level of 100 ppm to 500 ppm of EDTA salts in this coolant mixture is sufficient for virtually all food product applications. However a level of 10 ppm to 150 ppm appears optimal for most food applications.

In most direct use food applications, the salt is required to be dissolved in the aqueous phase and the sodium salt of EDTA is readily soluble in water, the calcium salt somewhat less so. In this application, any dissolved metal ions are likely to be distributed among the components of the coolant mixture. The glycerin component occupies around 75% or more of the total coolant composition. The sodium and calcium salts are virtually insoluble in this organic compound whereas the acid salt of EDTA is much more so.

Accordingly the chelation mixture used is a combination of the acid, sodium and calcium salts of EDTA at the previously described concentrations to ensure minimal residual dissolved metal ions within the whole coolant mixture.

By controlling the temperature at which the coolant enters the filtration and regeneration process, typically in a range 45° C. to 105° C., more typically 60° C.-95° C., EDTA, in excess of the required amount is solublised into the coolant mixture. As the temperature falls, so does the solubility of the EDTA mixture. The excess precipitates but because of the low particle weights remains in suspension, and is remove from the coolant as it passes again through the filtration and regeneration columns.

Example 4

Cost Efficient and Effective Cooling of the Coolant Mixture

As with any process which requires the heating and cooling of a product, thermal energy is applied to the product during the heating phase and removed during the cooling phase.

It is much more expensive to generate heat to raise product temperature than to generate cooling. It also requires considerably more energy to raise the product temperature from ambient to the required temperature for the correct processing to occur than it does to drop the product temperature to a point where the cooking/heating phase either stops or slows to acceptable or negligible levels.

The cooling process is a multi-phase process. The first is a phase where the coolant passes over the coolest product (70). This can be forced through pumping (60) but because of the very significant differences in coolant viscosity in relation to temperature, the thinner less viscous coolant tends to rise to the upper levels of the coolant chamber so it can easily be passed over a passive, or predominantly passive, gravity-fed heat extraction system so that the majority of the heat in this portion of the coolant can be absorbed by other coolants circulating through a series of heat exchangers. And this heat can be reutilized within the heating phase of the process. As the coolant temperature rises, it then passes over the hotter product (80).

It is also important to control the rate of cooling at this phase so as to prevent damage to product containers such as buckling of cans or fracture of glass jars and bottles. However, once any critical point for damage avoidance has been reached, the temperature differential between coolant and product can be amplified. Again, because of the viscosity differences, it is easy to pump coolant from the bottom and force heated coolant into a complex of indirect heat exchange systems (140, 160).

The design of the cooling system is simple. The coolant (100) is retained in a closed-loop system. The heated coolant passes through a series of pipework units (140) each surrounded by a plethora of metal fins (160) to enhance the heat removal process in a similar fashion to a conventional car radiator but without the need for pressurization. Atmospheric air is forced over the heat exchangers by fans (170) at a velocity of between 1 m/s and 5 m/s. Depending on the temperature of the incoming atmospheric air, it is possible to cool the coolant mixture to very low temperatures. For example, we have shown where the atmospheric air temperature drops from a daytime high of 22° C. to a night-time low of −15° C., it has been routinely possible to cool a reservoir of more than 60000 litres of coolant mixture to −5° C. or below using such an approach.

During the daytime, although the coolant will be cooled to much higher temperatures, usually around 5-10° C. above the prevailing ambient air temperature, with careful temperature control and mixing of the refrigerated coolant with warmer coolant will allow product to be rapidly cooled from 80° C. to 50° C. or less without the need for any additional refrigeration.

The rate of cooling and the capacity needed will obviously be different for each manufacturing operation and each product/container type but a heat exchange and cooling configuration as described will easily cool containerized product being pasteurized at a rate of 150-200 units per minute to 40° C.-45° C. It should also be pointed out that, depending on the prevalent relative humidity, it may be necessary to prevent the deposition of ice on the freezing coils and thus reducing cooling system efficiency.

This can be by any suitable method although we have found coating the exterior of the cooling system with a thin coat of glycerin/water mixture in a 66%: 34% ratio, prevents any ice from forming on the cooling coils or fins.

Example 5

Optimizing and Controlling the Product Cooling.

Each product/container combination has a unique energy processing/thermal conductivity requirement that will vary according to the processing method requirement for each product. For example, an essentially liquid fruit juice in a glass bottle will process differently to the same product in a plastic pouch. Equally the same fruit juice when pasteurized will have different requirements to the same juice sterilized in the same container.

U.S. Patent Application 61/478,491 details how all such parameters can be calculated for each defined product/container type. Based on that information, we can control both the temperature and flow rate of the coolant in contact with the product/container so as to maintain the necessary temperature differential between coolant and product and thus ensure the cooling process operates optimally. With the system controller able to accurately monitor coolant physical properties before and after contact with the product and its variance, we are able to not only maintain optimized cooling but also verify it is occurring.

Such an approach also minimizes any inefficient use of energy. It also can be used to optimize and maximize the cooling of the coolant mixture either after processing or for storing of additional reserves of cooling capacity.

The invention claimed is:

1. A coolant mixture comprising a mixture that is neither essentially water nor steam and maintains its liquid state throughout all processing and storage operations without the need for pressurization, even when in contact with foodstuffs whose temperature is greater than 120° C. or less than −18° C., wherein said mixture is able to continuously regenerate its cooling capacity and maintain its necessary functional properties, particularly viscosity, so that said coolant mixture effectively functions both as a low cost refrigerant storage source and high efficiency coolant capable of accelerating a cooling process for foodstuffs subjected to a heating process, wherein said coolant mixture remains non-corrosive to both product and processing components at all times by means of a recycling process comprising filtration, inactivation and regeneration steps that continuously removes any contaminants, liquid, gaseous, solid or ionic that would induce a corrosive reaction in the coolant mixture and both said components of the coolant mixture and of the coolant recycling process further comprise only components approved to directly contact foodstuffs and foodstuff containers.

2. A coolant mixture according to claim 1 wherein the coolant mixture is only derived of components classified as GRAS (Generally Regarded As Safe) or better.

3. A coolant mixture according to claim 1 wherein the temperature of the liquid coolant is maintained between −30° C. and 0° C.

4. A coolant mixture according to claim 1 wherein the coolant mixture is essentially greater than 75% pure glycerol and less than 20% water.

5. A coolant mixture according to claim 1 wherein the coolant mixture is permanently maintained in a non-corrosive state by continuous removal of any contaminants, whether liquids, solids, gaseous and ionic mixtures therein.

6. A coolant mixture according to claim 1 wherein the coolant is essentially maintained in a non-corrosive state by filtering through suitable recycling media.

7. A coolant mixture according to claim 6 wherein said filtration media is preferentially composed of a mixture of Zeolites and chelation mixture, specific for the contaminants likely to be found in said coolant mixture after any processing operation.

8. A coolant mixture according to claim 6 wherein said filtration media always contains a suitable chelation mixture.

9. A coolant mixture according to claim 8 wherein said chelation mixture only contains a mixture of an acid, sodium salt and calcium salt of EDTA, preferably in a range of 5-500 ppm, but said chelation mixture is optimized for those metal ions present in the coolant.

10. A coolant mixture according to claim 1 wherein the coolant mixture can be rapidly chilled by any suitable method to −18° C. or below without a change of state.

11. A coolant mixture according to claim 1 wherein the cooling of said coolant mixture and its maintenance in a cooled state is achieved essentially using atmospheric air.

12. A coolant mixture according to claim 1 wherein the viscosity of the coolant mixture is maintained within its optimum range for product cooling, preferably within a range of 1.9 and 200 centipoises/mPa.

13. A coolant mixture, according to claim 1 wherein said coolant mixture accelerates the cooling process by between 1.8× and 2.5× faster than conventional direct or indirect gaseous. or liquid food cooling systems 14. A method of monitoring, measurement, controlling, optimizing and accelerating a cooling process for products, particularly foodstuffs using a coolant mixture, that is neither essentially water nor steam and maintains its liquid state throughout all processing and storage operations without the need for pressurization, even when in contact with foodstuffs whose temperature is greater than 120° C. or less than −18° C., wherein said coolant mixture is able to continuously regenerate its cooling capacity and maintain its necessary functional properties, particularly viscosity, so that said coolant mixture effectively functions both as a low cost refrigerant storage source and high efficiency coolant capable of accelerating the cooling process for foodstuffs subjected to a heating process, wherein said coolant mixture remains non-corrosive to both product and processing components at all times by means of a recycling process comprising filtration, inactivation and regeneration steps that continuously removes any contaminants, liquid, gaseous, solid or ionic that would induce a corrosive reaction in the coolant mixture and both said components of the coolant mixture and of the coolant recycling process further comprise only components approved to directly contact foodstuffs and foodstuff containers.

15. A method according to claim 14 wherein the coolant mixture and method can be applied to any suitably treated unconstrained product or product constrained within a container.

16. A method according to claim 14 wherein application of said coolant mixture to the product or its container results in accelerated product cooling.

17. A method according to claim 14 wherein application of said coolant mixture to the product or its container results in reduced or eliminated product variability.

18. A method according to claim 14 where in the coolant mixture is maintained in a cooled state by an air flow system using atmospheric air, preferably a forced air flow.

19. A method according to claim 14 wherein the coolant mixture itself functions as a reservoir for refrigerant.

20. An apparatus for monitoring, measurement, controlling, optimizing, and accelerating a cooling for products, particularly, foodstuffs comprising:

a coolant mixture comprising a mixture that is neither essentially water nor steam and maintains a liquid state throughout all processing and storage operations without the need for pressurization, even when in contact with foodstuffs whose temperature is greater than 120° C. or less than −18° C.;

a recycling means for having said coolant mixture remain non-corrosive to both product and processing components at all times by means of a recycling process comprising filtration, inactivation and regeneration steps that continuously removes any contaminants, liquid, gaseous, solid, or ionic that would induce a corrosive reaction in the coolant mixture; and both said components of the coolant mixture and of the coolant recycling process further comprise only components approved to directly contact foodstuffs and foodstuff containers.

21. An apparatus according to claim 20 wherein the recycling means have at least one of filtration media comprising Zeolite, filtration media comprising salts of EDTA, a prefilter or centrifuge, and an indirect air cooling system for cooling the coolant mixture.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,893,518 B2 | |
| APPLICATION NO. | : 13/452207 | |
| DATED | : November 25, 2014 | |
| INVENTOR(S) | : P. B. Newman | |

It is certified that error appears in the above-identified patent and that said Letters Patent is hereby corrected as shown below:

| COLUMN | LINE | ERROR |
|---|---|---|
| 16 (Claim 20, | 64 line 2) | "cooling for" should read --cooling process for-- |

Signed and Sealed this
Sixteenth Day of February, 2016

Michelle K. Lee
*Director of the United States Patent and Trademark Office*